(12) United States Patent
Kamo et al.

(10) Patent No.: US 10,637,053 B2
(45) Date of Patent: Apr. 28, 2020

(54) PRODUCTION METHOD OF NEGATIVE ELECTRODE ACTIVE MATERIAL FOR NONAQUEOUS ELECTROLYTE SECONDARY BATTERY, PRODUCTION METHOD OF NONAQUEOUS ELECTROLYTE SECONDARY BATTERY, PRODUCTION METHOD OF NEGATIVE ELECTRODE FOR NONAQUEOUS ELECTROLYTE SECONDARY BATTERY, AND NONAQUEOUS ELECTROLYTE SECONDARY BATTERY

(71) Applicants: SHIN-ETSU CHEMICAL CO., LTD., Tokyo (JP); MITSUI CHEMICALS, INC., Tokyo (JP)

(72) Inventors: Hiromichi Kamo, Takasaki (JP); Takakazu Hirose, Annaka (JP); Katsunori Nishiura, Chiba (JP); Hitoshi Onishi, Chiba (JP)

(73) Assignees: SHIN-ETSU CHEMICAL CO., LTD., Tokyo (JP); MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 15/759,334

(22) PCT Filed: Aug. 29, 2016

(86) PCT No.: PCT/JP2016/003912
§ 371 (c)(1),
(2) Date: Mar. 12, 2018

(87) PCT Pub. No.: WO2017/043039
PCT Pub. Date: Mar. 16, 2017

(65) Prior Publication Data
US 2018/0254480 A1    Sep. 6, 2018

(30) Foreign Application Priority Data

Sep. 10, 2015 (JP) .................. 2015-178612
Dec. 28, 2015 (JP) .................. 2015-257097

(51) Int. Cl.
*H01M 4/48* (2010.01)
*H01M 10/058* (2010.01)
(Continued)

(52) U.S. Cl.
CPC ........... *H01M 4/483* (2013.01); *C01B 33/325* (2013.01); *H01M 10/058* (2013.01);
(Continued)

(58) Field of Classification Search
CPC ............... H01M 4/483; H01M 10/058; H01M 10/0525; H01M 4/48; H01M 4/139;
(Continued)

(56) References Cited

U.S. PATENT DOCUMENTS 5,395,711 A    3/1995   Tahara et al.
2005/0084439 A1    4/2005   Imamura et al.
(Continued)

FOREIGN PATENT DOCUMENTS

JP    H11-283670 A    10/1999
JP    2000-021444 A    1/2000
(Continued)

OTHER PUBLICATIONS

English Translation of JP 2005235589 (Year: 2005).*
(Continued)

*Primary Examiner* — Andrew J. Oyer
(74) *Attorney, Agent, or Firm* — Oliff PLC

(57) ABSTRACT

A production method of a negative electrode active material containing a silicon compound ($SiO_x$: $0.5 \leq x \leq 1.6$) that contains Lithium includes: making a silicon compound into
(Continued)

which the lithium has been inserted contact with a solution B containing a polycyclic aromatic compound or a derivative thereof or both thereof (here, the solution B contains one or more kinds selected from an ether-based solvent, a ketone-based solvent, an ester-based solvent, an alcohol-based solvent, and an amine-based solvent as a solvent); and making the silicon compound contact with a solution C (here, the solution C contains one or more kinds selected from an ether-based material, a ketone-based material, and an ester-based material as the solvent, and contains a compound having a quinoid structure in a molecule as a solute).

20 Claims, 3 Drawing Sheets

(51) Int. Cl.
  *H01M 10/0525* (2010.01)
  *C01B 33/32* (2006.01)
  *H01M 4/02* (2006.01)
  *H01M 4/139* (2010.01)
  *H01M 4/485* (2010.01)
  *H01M 4/04* (2006.01)

(52) U.S. Cl.
  CPC ..... *H01M 10/0525* (2013.01); *C01P 2006/40* (2013.01); *H01M 2004/027* (2013.01); *H01M 2220/30* (2013.01)

(58) Field of Classification Search
  CPC ........ H01M 2220/30; H01M 2004/027; C01B 33/325; C01B 33/32; C01P 2006/40
  See application file for complete search history.

(56) References Cited

U.S. PATENT DOCUMENTS

| | | |
|---|---|---|
| 2006/0083987 A1 | 4/2006 | Konishiike et al. |
| 2006/0099507 A1 | 5/2006 | Kogetsu et al. |
| 2008/0176137 A1 | 7/2008 | Endo et al. |
| 2009/0075173 A1 | 3/2009 | Jeong et al. |
| 2009/0202911 A1 | 8/2009 | Fukuoka et al. |
| 2011/0135810 A1 | 6/2011 | Yakovleva et al. |
| 2018/0287193 A1 | 10/2018 | Matsuno et al. |

FOREIGN PATENT DOCUMENTS

| | | | |
|---|---|---|---|
| JP | 2997741 B2 | | 1/2000 |
| JP | 2000-195505 A | | 7/2000 |
| JP | 2001-076710 A | | 3/2001 |
| JP | 2001-185127 A | | 7/2001 |
| JP | 2001-199716 A | | 7/2001 |
| JP | 2002-042806 A | | 2/2002 |
| JP | 2003-206126 A | | 7/2003 |
| JP | 2005-235439 A | | 9/2005 |
| JP | 2005-235589 A | | 9/2005 |
| JP | 2005235589 A | * | 9/2005 |
| JP | 2006-114454 A | | 4/2006 |
| JP | 2006-164954 A | | 6/2006 |
| JP | 2007-234255 A | | 9/2007 |
| JP | 2008-177346 A | | 7/2008 |
| JP | 2008-251369 A | | 10/2008 |
| JP | 2008-282819 A | | 11/2008 |
| JP | 2009-070825 A | | 4/2009 |
| JP | 2009-205950 A | | 9/2009 |
| JP | 2009-212074 A | | 9/2009 |
| JP | 2010-055923 A | | 3/2010 |
| JP | 2011-051844 A | | 3/2011 |
| JP | 2013-513206 A | | 4/2013 |
| WO | 2017/085902 A1 | | 5/2017 |

OTHER PUBLICATIONS

Mar. 8, 2019 extended European Search Report issued in European Patent Application No. 16843908.1.
Nov. 15, 2016 International Search Report issued in International Patent Application No. PCT/JP2016/003912.
Nov. 7, 2019 Office Action issued in Taiwanese Patent Application No. 105129065.
Häupler, Bernhard et al., "Carbonyls: Powerful Organic Materials for Secondary Batteries", Advanced Energy Materials, vol. 5, (2015), pp. 1-34.
Algharaibeh, Zaher et al., "An Asymmetric Supercapacitor With Anthraquinone and Dihydroxybenzene Modified Carbon Fabric Electrodes", Electrochemistry Communications, vol. 13, (2011), pp. 147-149.
Tomai, Takaaki et al., "Metal-Free Aqueous Redox Capacitor Via Proton Rocking-Chair System in an Organic-Based Couple", Scientific Reports, 4:3591, (2014), pp. 1-6.
Isikli, Süheda et al., "Substrate-Dependent Performance of Supercapacitors Based on an Organic Redox Couple Impregnated on Carbon", Journal of Power Sources, vol. 206, (2012), pp. 53-58.
Pognon, Grégory et al., "Performance and Stability of Electrochemical Capacitor Based on Anthraquinone Modified Activated Carbon", Journal of Power Sources, vol. 196, (2011), pp. 4117-4122.
Nov. 21, 2019 Office Action issued in European Patent Application No. 16 843 908.1.

* cited by examiner

PRODUCTION METHOD OF NEGATIVE ELECTRODE ACTIVE MATERIAL FOR NONAQUEOUS ELECTROLYTE SECONDARY BATTERY, PRODUCTION METHOD OF NONAQUEOUS ELECTROLYTE SECONDARY BATTERY, PRODUCTION METHOD OF NEGATIVE ELECTRODE FOR NONAQUEOUS ELECTROLYTE SECONDARY BATTERY, AND NONAQUEOUS ELECTROLYTE SECONDARY BATTERY

TECHNICAL FIELD

The present invention relates to a production method of a negative electrode active material for nonaqueous electrolyte secondary batteries, a production method of a nonaqueous electrolyte secondary battery, a production method of a negative electrode for nonaqueous electrolyte secondary batteries, and a nonaqueous electrolyte secondary battery.

BACKGROUND ART

In recent years, small-sized electronic devices represented by mobile terminals and the like have been widely spread and further down-sizing, lighter weight and longer life are strongly demanded. To a market demand like this, secondary batteries capable of obtaining, in particular, a smaller size, a lighter weight and a higher energy density have been developed. The secondary batteries are studied to be applied also to, without limiting to small-sized electronic devices, large-sized electronic devices represented by automobiles and power-storage systems represented by houses or the like.

Among these, a lithium ion secondary battery is highly expected because a smaller size and higher capacity are easy to be obtained and the energy density higher than that of a lead battery or a nickel-cadmium battery can be obtained.

The lithium ion secondary battery comprises a positive electrode, a negative electrode, a separator, and an electrolytic solution. The negative electrode comprises a negative electrode active material related to a charge/discharge reaction.

As the negative electrode active material, while a carbon material is widely used, a further improvement in a battery capacity is demanded from recent market demand. As a factor for improving the battery capacity, it has been studied to use silicon as the negative electrode active material. This is because a great improvement of the battery capacity may be expected since silicon has a theoretical capacity (4199 mAh/g) no smaller than 10 times a theoretical capacity of graphite (372 mAh/g). A development of a silicon material as the negative electrode active material comprises studies on not only a silicon simple substance but also on compounds represented by alloys, oxides or the like. Further, shapes of the active material have been studied, from a coating type, which is standard in the carbon material, to an integrated type directly deposited on a current collector.

However, when, as the negative electrode active material, the silicon is used as a main raw material, since particles of the negative electrode active material expand and contract during charge/discharge, mainly the neighborhood of a superficial layer of the particles of negative electrode active material tends to crack. Further, an ionic substance is generated inside of the active material, and the particles of negative electrode active material tends to be broken. When a superficial layer of the particles of negative electrode active material is broken, a new surface is generated thereby, and a reaction area of the particles of the negative electrode active material increases. At this time, since a decomposition reaction of an electrolytic solution occurs on the new surface and a film that is a decomposition product of the electrolytic solution is formed on the new surface, the electrolytic solution is consumed. Therefore, cycle characteristics of the battery tends to be degraded.

Until now, in order to improve an initial efficiency and the cycle characteristics of a battery, negative electrode materials for lithium ion secondary batteries comprising the silicon material as a main material and electrode configurations have been variously studied.

Specifically, in order to obtain excellent cycle characteristics and high safety, silicon and amorphous silicon dioxide are simultaneously deposited by using a vapor phase method (see, for example, Patent Document 1 below). Further, in order to obtain high battery capacity and safety, a carbon material (an electron conducting material) is provided on a superficial layer of particles of silicon oxide (see, for example, Patent Document 2). Further, in order to improve the cycle characteristics and to obtain high input/output characteristics, an active material containing silicon and oxygen is prepared and an active material layer comprising a high oxygen ratio in the neighborhood of a current collector is formed (see, for example, Patent Document 3). Still further, in order to improve the cycle characteristics, oxygen is contained in a silicon active material such that an average oxygen content is 40 atomic percent or lower, and an oxygen content is high in a place close to a current collector (see, for example, Patent Document 4).

Further, in order to improve an initial charge/discharge efficiency, a nano composite containing a Si phase, $SiO_2$ and a $M_yO$ metal oxide is used (see, for example, Patent Document 5). Still further, in order to improve the initial charge/discharge efficiency, pre-doping in which a Lithium-containing material is added to a negative electrode, and Lithium is decomposed in a place where a negative electrode potential is high and is returned to a positive electrode is performed (see, for example, Patent Document 6).

Still further, in order to improve the cycle characteristics, $SiO_x$ ($0.8 \leq x \leq 1.5$, a particle size range=1 µm to 50 µm) and a carbon material are mixed and baked at a high temperature (see, for example, Patent Document 7). Further, in order to improve the cycle characteristics, a mole ratio of oxygen to silicon in a negative electrode active material is set to from 0.1 to 1.2, and, in the neighborhood of an interface of the active material and a current collector, an active material is controlled in the range where a difference of a maximum value and a minimum value of the mole ratios of oxygen amounts to silicon amounts is 0.4 or smaller (see, for example, Patent Document 8). Still further, in order to improve battery load characteristics, a metal oxide containing lithium is used (see, for example, Patent Document 9). Further, in order to improve the cycle characteristics, a hydrophobic layer such as a silane compound is formed on a superficial layer of a silicon material (see, for example, Patent Document 10).

Still further, in order to improve the cycle characteristics, a silicon oxide is used, and a graphite film is formed on a superficial layer thereof to impart electrical conductivity (see, for example, Patent Document 11). In this case, in the Patent Document 11, regarding a shift value obtained from a Raman spectrum of the graphite film, broad peaks appear at 1330 $cm^{-1}$ and 1580 $cm^{-1}$, and an intensity ratio thereof $I_{1330}/I_{1580}$ is $1.5 < I_{1330}/I_{1580} < 3$.

Further, in order to improve high battery capacity and cycle characteristics, particles comprising a silicon micro crystallite phase dispersed in a silicon dioxide are used (see, for example, Patent Document 12). Still further, in order to improve overcharge and overdischarge characteristics, a silicon oxide in which an atomic ratio of silicon and oxygen is controlled to 1:y (0<y<2) is used (see, for example, Patent Document 13).

Further, in order to improve the high battery capacity and initial efficiency, there is a method in which an alloy-based material is contacted with a solution containing an alkali metal and a polycyclic aromatic compound, followed by soaking in a solution that desorbs an alkali metal element (see, for example, Patent Document 14).

CITATION LIST

Patent Literature

Patent Document 1: Japanese Unexamined Patent Publication (Kokai) No. 2001-185127
Patent Document 2: Japanese Unexamined Patent Publication (Kokai) No. 2002-042806
Patent Document 3: Japanese Unexamined Patent Publication (Kokai) No. 2006-164954
Patent Document 4: Japanese Unexamined Patent Publication (Kokai) 2006-114454
Patent Document 5: Japanese Unexamined Patent Publication (Kokai) 2009-070825
Patent Document 6: Japanese Unexamined Patent Publication (Kohyo) 2013-513206
Patent Document 7: Japanese Unexamined Patent Publication (Kokai) 2008-282819
Patent Document 8: Japanese Unexamined Patent Publication (Kokai) 2008-251369
Patent Document 9: Japanese Unexamined Patent Publication (Kokai) 2008-177346
Patent Document 10: Japanese Unexamined Patent Publication (Kokai) 2007-234255
Patent Document 11: Japanese Unexamined Patent Publication (Kokai) 2009-212074
Patent Document 12: Japanese Unexamined Patent Publication (Kokai) No. 2009-205950
Patent Document 13: Japanese Patent No. 2997741
Patent Document 14: Japanese Unexamined Patent Publication (Kokai) No. 2005-235439

SUMMARY OF INVENTION

Technical Problem

As was described above, in recent years, higher performance and multi-functionalization of small-sized electronic devices represented by the mobile terminals and the like have been proceeded, and a secondary battery that is a main power source thereof, in particular, a lithium ion secondary battery is required to have an increased battery capacity. As one method for solving the problem, it is desired to develop a nonaqueous electrolyte secondary battery formed of a negative electrode that uses a silicon material as a main material. Further, the nonaqueous electrolyte secondary battery that uses the silicon material is desired to have nearly the same cycle characteristics as a nonaqueous electrolyte secondary battery that uses the carbon material.

Accordingly, by using the silicon oxide modified by insertion and partial desorption of Lithium as a negative electrode active material, a cycle retention rate and an initial efficiency of the battery have been improved. However, due to modification with Lithium, the silicon oxide after modification has relatively low water resistance. Therefore, there was a problem such that stabilization of a slurry containing the silicon oxide after modification, which is prepared during production of the negative electrode tends to be insufficient.

Further, even when the alkali metal is desorbed from the alloy-based material after modification by the method disclosed in Patent Document 14, the activity of the alloy-based material remains high. Therefore, there was a problem that in an electrode preparation step, when an aqueous slurry is formed from the alloy-based material, a Lithium alloy comprising the same activity as a Lithium metal violently reacts with water or a binder (a reaction accompanying ignition or boiling of solvent) to be difficult to prepare a slurry. Still further, when a nonaqueous electrolyte secondary battery is prepared with the slurry undergone an unnecessarily high temperature state due to the violent reaction like this, there was a problem that the battery characteristics are degraded. Further, when this method is applied after forming an electrode from the alloy-based material, because a Lithium portion is insufficiently deactivated, the deactivation occurs under a low humidity environment (a dew point at room temperature of 20° is −20° C. or lower), excess Lithium compounds such as Lithium oxide, hydroxide, carbonate or the like are generated on a surface to degrade the battery characteristics.

The present invention was performed in view of the problems such as described above and it is an object of the present invention to provide a production method of a negative electrode active material for nonaqueous electrolyte secondary batteries, a production method of a nonaqueous electrolyte secondary battery, and a production method of a negative electrode for nonaqueous electrolyte secondary batteries, capable of increasing the battery capacity and capable of improving the cycle characteristics. Further, it is an object of the present invention to provide a nonaqueous electrolyte secondary battery having a large battery capacity and high cycle characteristics.

Solution to Problem

In order to achieve the above object, the present invention provides a production method of a negative electrode active material for nonaqueous electrolyte secondary batteries containing a silicon compound ($SiO_x$: 0.5≤x≤1.6) that contains Lithium comprising: preparing a silicon compound ($SiO_x$: 0.5≤x≤1.6); inserting lithium into the silicon compound; making the silicon compound into which the lithium has been inserted contact with a solution B containing a polycyclic aromatic compound or a derivative thereof or both thereof (here, the solution B contains one or more kinds selected from an ether-based solvent, a ketone-based solvent, an ester-based solvent, an alcohol-based solvent, and an amine-based solvent as the solvent); and making the silicon compound that has been contacted with the solution B contact with a solution C (here, the solution C contains one or more kinds selected from an ether-based material, a ketone-based material, and an ester-based material as the solvent, and a compound having a quinoid structure in a molecule as a solute).

In the inventive production method of the negative electrode active material, the silicon compound in which Lithium has been inserted is contacted with the solution B to desorb a part of active Lithium from the silicon compound to prevent a violent reaction (a reaction accompanying ignition or boiling of the solvent) from occurring in the following making contact with the solution C. Further, when the ether-based material, the ketone-based material, or the ester-based material is used as the solvent of the solution C, since activity of a proton contained in a solvent molecule is low, in a desorption reaction of Lithium from the silicon compound into which the lithium has been inserted, a side reaction is difficult to occur. Still further, since a compound having the quinoid structure in a molecule, which is a solute of the solution C, draws the Lithium from the silicon compound containing active Lithium in the solvent such as described above to form salts of quinones with the Lithium to be dissolved in the solvent, the Lithium can be drawn until an equilibrium state is achieved.

At this time, in the making the silicon compound contact with the solution B, it is preferable to make the silicon compound contact with the solution B for 3 minutes or more.

When the silicon compound is contacted with the solution B for 3 minutes or more, the active Lithium may be more sufficiently desorbed.

Further, at this time, it is preferable that, in the inserting lithium, the silicon compound is contacted with a solution A (here, the solution A has the ether-based solvent as the solvent) containing lithium for 3 minutes or more to insert the lithium into the silicon compound.

Thus, the Lithium can be inserted without largely increasing the temperature. Thereby, since a crystalline Lithium silicate that causes degradation of the cycle characteristics is generated with difficulty in the silicon compound, the cycle characteristics can be prevented from being degraded. Further, by making contact with the solution A for 3 minutes or more, the Lithium may be more sufficiently inserted into the silicon compound.

At this time, as the solution A containing the lithium, a solution $A_1$ containing lithium and a polycyclic aromatic compound or its derivative or a straight chain polyphenylene compound or its derivative, or a solution $A_2$ containing lithium and amines (here, the solution $A_1$ and solution $A_2$ contain the ether-based solvent as the solvent) can be preferably used.

When the solution like this is used as the solution A containing the lithium, the Lithium may be more uniformly inserted into the silicon compound, in addition, the Lithium may be efficiently inserted.

Further, at this time, in the inventive production method of the negative electrode active material, as the solution A containing the lithium, it is preferable to use the solution $A_1$.

When the solution $A_1$ is used, the Lithium can be particularly efficiently inserted. When the solution containing in particular the straight chain polyphenylene compound or its derivative is used as the solution $A_1$, the Lithium can be inserted particularly efficiently.

At this time, it is preferable to use one or more kinds of naphthalene, anthracene, phenanthrene, naphthacene, pentacene, pyrene, picene, triphenylene, coronene, chrysene, and derivatives thereof as the polycyclic aromatic compound, and to use compounds in which aromatic rings are linearly bonded via a single bond, that is, one or more kinds of biphenyl, terphenyl, and derivative thereof as the straight chain polyphenylene compound. The triphenylene is not categorized to the straight chain polyphenylene compound but to the polycyclic aromatic compound, because the bond of the aromatic rings is circular.

As the polycyclic aromatic compound contained in the solution $A_1$ and solution B, and as the straight chain polyphenylene compound contained in the solution $A_1$, these compounds can be used.

Further, at this time, the compound having a quinoid structure in the molecule is preferably benzoquinone, quinodimethane, quinodiimine, or derivatives thereof.

As a solute of the solution C, those like these can be used. Among compounds having the quinoid structure in the molecule, particularly when these compounds are used, the active Lithium can be efficiently drawn from the silicon compound containing the active Lithium in the solvent.

At this time, it is possible that before the inserting lithium, forming an electrode containing the silicon compound is included, and to the silicon compound contained in the electrode, the inserting lithium, the making contact with the solution B, and the making contact with the solution C are applied.

In the inventive production method of the negative electrode active material, after forming the silicon compound into a state of the electrode, the inserting lithium and the contacting with the solution B and solution C may be performed. When the negative electrode active material is prepared like this, since the active Lithium portion contained in the silicon compound is deactivated in advance, even under a low humidity environment, an excess Lithium compound is difficult to be generated on a surface of the active material, and the battery characteristics can be prevented from being degraded.

Further, in order to achieve the above object, the present invention provides a production method of a nonaqueous electrolyte secondary battery comprising: producing a negative electrode active material for nonaqueous electrolyte secondary batteries according to a production method of a negative electrode active material for secondary batteries described in any one of those described above; and producing a nonaqueous electrolyte secondary battery using an electrode containing the negative electrode active material for nonaqueous electrolyte secondary batteries.

By this configuration, since the battery characteristics can be suppressed from being degraded due to heat generation during preparation of the electrode and generation of an excess Lithium compound on an electrode surface, or the like, a nonaqueous electrolyte secondary battery having excellent battery characteristics can be formed.

Further, in order to achieve the above object, the present invention is a production method of a negative electrode for nonaqueous electrolyte secondary batteries containing a negative electrode active material containing a silicon compound $SiO_x$ (0.5≤x≤1.6) containing lithium comprising: forming an electrode containing the silicon compound $SiO_x$ (0.5≤x≤1.6); inserting Lithium in the silicon compound contained in the electrode; making the electrode containing the silicon compound in which the lithium has been inserted contact with a solution B containing a polycyclic aromatic compound or its derivative or both thereof (here, the solution B contains one or more kinds selected from an ether-based solvent, a ketone-based solvent, an ester-based solvent, an alcohol-based solvent, and an amine-based solvent as the solvent) to make the solution B contact with the silicon compound; making the electrode that has been contacted with the solution B contact with a solution C (here, the solution C contains one or more kinds selected from an ether-based material, a ketone-based material, and an ester-based material as the solvent, and a compound having a quinoid structure in the molecule as a solute) to make the solution C contact with the silicon compound.

According to the method like this, since an active Lithium portion contained in the silicon compound is deactivated in advance, even under a low humidity environment, a negative electrode in which an excess Lithium compound is difficult to be generated on a surface of the active material may be produced. Thus, the battery characteristics of the nonaqueous electrolyte secondary battery using the negative electrode produced according to this method can be prevented from being degraded.

Further, in order to achieve the above object, the present invention provides a nonaqueous electrolyte secondary battery comprising the negative electrode for the nonaqueous electrolyte secondary batteries produced according to the above-described production method of the negative electrode for the nonaqueous electrolyte secondary batteries.

When the negative electrode is produced according to the method as described above, since heat generation and generation of an excess Lithium compound on an electrode surface during preparation of the electrode can be prevented from occurring, a nonaqueous electrolyte secondary battery comprising the negative electrode like this has excellent battery characteristics.

Advantageous Effects of Invention

According to the inventive production method of the negative electrode active material and the inventive production method of the negative electrode it is possible to produce a negative electrode active material and a negative electrode capable of obtaining high capacity and excellent cycle characteristics and initial charge/discharge characteristics when applied to the nonaqueous electrolyte secondary batteries.

Further, also in secondary batteries containing the negative electrode active material produced by the inventive production method, the similar characteristics can be obtained. Still further, also in electronic devices, electric tools, electric vehicles, power storage systems or the like, which use the secondary batteries, the similar effect can be obtained.

DESCRIPTION OF EMBODIMENTS

Hereinafter, an embodiment of the present invention will be described. However, the present invention is not limited thereto.

As was described above, as one of methods for increasing the battery capacity of the nonaqueous secondary battery, it has been studied to use the negative electrode that uses the silicon material as a main material as the negative electrode of the nonaqueous secondary batteries.

The nonaqueous electrolyte secondary battery that uses the silicon material is desired to have the cycle characteristics nearly the same as the nonaqueous electrolyte secondary battery that uses a carbon material. However, a negative electrode material that shows equivalent cycle safety as the nonaqueous electrolyte secondary battery that uses the carbon material has not been proposed. Further, since the silicon compound containing, in particular, oxygen has low initial efficiency compared with the carbon material, an improvement of the battery capacity was limited by that amount.

There, by using a silicon oxide modified by insertion and partial desorption of Lithium as a negative electrode active material, a cycle retention rate and an initial efficiency of the battery have been improved. However, due to modification with Lithium, the silicon oxide after modification has relatively low water resistance. Therefore, there was a problem such that stabilization of the silicon oxide after modification to a slurry tends to be insufficient during preparation of the negative electrode. Further, also in the case where after the formation of the negative electrode, the silicon compound in the negative electrode is modified with Lithium, there was a problem that since the Lithium portion in the modified silicon compound is insufficiently deactivated, when left in a dry air, the Lithium portion is gradually deactivated to generate a Lithium oxide, Lithium hydroxide, Lithium carbonate or the like on a surface to result in degrading the battery characteristics.

There, the present inventors have conducted intensive studies about a production method of a negative electrode active material and a production method of a negative electrode, which are capable of obtaining excellent cycle characteristics and initial efficiency when used in the nonaqueous electrolyte secondary batteries, and came to complete the present invention.

Figure 1:
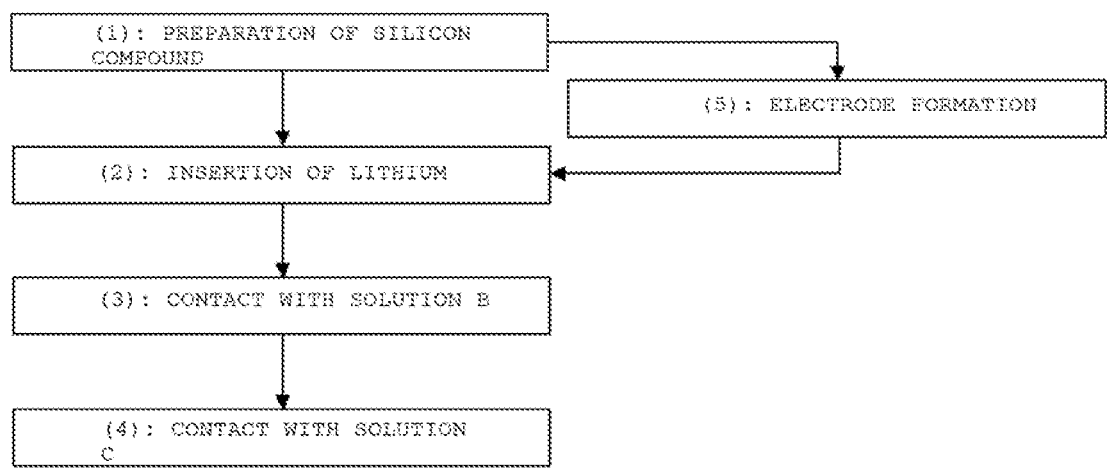
FIG. 1 shows a flowchart showing one example of an inventive production method of a negative electrode active material.

According to an inventive production method of a negative electrode active material for nonaqueous electrolyte secondary batteries, as shown in FIG. 1, first, preparing a silicon compound ($SiO_x$: $0.5 \leq x \leq 1.6$) is carried out (step 1 of FIG. 1). Then, inserting lithium into the silicon compound is carried out (step 2 of FIG. 1). At this time, before the inserting the lithium, in advance, forming an electrode containing the silicon compound may be carried out (step 5 of FIG. 1).

Subsequently, making the silicon compound in which the lithium has been inserted contact with a solution B (here, the solution B contains one or more kinds selected from an ether-based solvent, a ketone-based solvent, an ester-based solvent, an alcohol-based solvent, and an amine-based solvent as the solvent) containing a cyclic aromatic compound or its derivative or both thereof is carried out (step 3 of FIG. 1). Then, making the silicon compound that has been contacted with the solution B contact with a solution C (here, the solution C contains one or more kinds of an ether-based material, a ketone-based material, and an ester-based material as the solvent, and a compound having a quinoid structure in a molecule as a solute) is carried out (step 4 of FIG. 1). Further, when carrying out the steps 3 and 4 after formation of the electrode by undergoing a step 5, for example, by soaking the electrode in the solution B and the solution C, or by spraying the solution B and the solution C on the electrode, the solution B and the solution C can be brought into contact with the silicon compound contained in the electrode.

Since the negative electrode active material containing the silicon compound produced according to the inventive production method like this is a silicon-based active material mainly made of the silicon compound, the battery capacity can be made larger. Further, by making the Lithium contain in the silicon compound, the irreversible capacity can be reduced at the time of initial charge/discharge of the battery containing the silicon-based active material. Further, when the inventive production method of the negative electrode active material contains the step 3 and the step 4 of FIG. 1, which are inactivation steps of the Lithium contained in the silicon compound, since the Lithium contained in the silicon compound is sufficiently deactivated, thus, the negative electrode active material becomes difficult to cause the violent reaction with an aqueous slurry.

Further, when the inserting the lithium and making contact with the solution B and the solution C (step 2 to step 4) are carried out after forming the silicon compound into the electrode, since the active Lithium portion contained in the silicon compound has been deactivated in advance and an excess lithium compound is difficult to be generated on a surface of the active material, the battery characteristics can be suppressed from being degraded.

Subsequently, the inventive production method of the negative electrode active material will be more specifically described.

(1. Production Method of Negative Electrode Active Material)

First, the silicon compound ($SiO_x$: $0.5 \leq x \leq 1.6$) is prepared (step 1 of FIG. 1). The silicon compound represented by the general formula $SiO_x$ ($0.5 \leq x \leq 1.6$) like this can be prepared according to, for example, the following method. First, a raw material that generates a silicon oxide gas is heated in the temperature range of from 900° C. to 1600° C. under the presence of an inert gas or under reduced pressure to generate the silicon oxide gas. In this case, as the raw material, a mixture of a metallic silicon powder and a silicon dioxide powder can be used, and, when considering the presence of surface oxygen of the metallic silicon powder and a slight amount of oxygen in a reaction furnace, a mixing mole ratio is desirable to be in the range of 0.8<metallic silicon powder/silicon dioxide powder<1.3. A gas generated from the raw material is deposited on an absorption plate. Subsequently, a deposit is taken out in a state where a temperature in the reaction furnace is lowered to 100° C. or lower, followed by pulverizing and powderizing using a ball mill or a jet mill. By the way, the crystallinity such as a size of Si crystallites in the silicon compound can be controlled by adjusting a charge range (mixing molar ratio) or a heating temperature of the raw material. Further, the crystallinity can be controlled also by heat treating after generation of the silicon compound.

In particular, the silicon compound is preferably prepared such that a half-value width ($2\theta$) of a diffraction peak due to a Si (111) crystal plane obtained by X-ray diffractometry is 1.2° or larger and a crystallite size due to the crystal plane is 7.5 nm or less.

The silicon compound having such half-value width and crystallite size can improve the battery characteristics because of low crystallinity and a small abundance of Si crystal. Further, when the silicon compound having low crystallinity like this is present, a silicon compound can be stably generated.

Further, as the composition of the silicon compound to be prepared, x is preferably closer to 1. This is because high cycle characteristics can be obtained. Still further, the composition of the silicon compound in the present invention does not necessarily mean a purity of 100%, and may contain a slight amount of impurities.

Further, the silicon compound may be composited with a carbon material. As a method of compositing, there are a method of forming a carbon film on a surface of the silicon compound by a thermal CVD (Chemical Vapor Deposition) method, a method of physically mixing the silicon compound and the carbon material, or the like. By making the carbon material and the silicon compound form a composite, high conductivity may be imparted.

In particular, as a method of generating the carbon film on the surface of the silicon compound, the thermal CVD method is desirable. In the thermal CVD method, first, the silicon compound is set in a furnace. Then, a hydrocarbon gas is filled in the furnace followed by elevating an inner furnace temperature. By elevating the inner furnace temperature, the hydrocarbon gas is decomposed and a carbon film is formed on a surface of the silicon compound. A decomposition temperature of the hydrocarbon gas is not particularly limited but is desirably 1200° C. or lower, and particularly desirably 950° C. or lower. This is because unintended disproportionation of the silicon compound may be suppressed.

When the carbon film is formed by the thermal CVD method, by controlling, for example, a pressure and a temperature in the furnace, the carbon film can be formed on a superficial layer of the powder material while adjusting a coverage or a thickness of the carbon film.

The hydrocarbon gas used in the thermal CVD method is not particularly limited but it is desirable that $3 \geq n$ in a $C_nH_m$ composition. This is because the production cost can be reduced and the physical properties of a decomposition product are excellent.

Subsequently, lithium is inserted into the silicon compound (step 2 of FIG. 1). At this time, before inserting the lithium, an electrode containing the silicon compound may be formed in advance (step 5 in FIG. 1).

The inventive negative electrode active material contains the silicon compound capable of storing and releasing lithium ions. And, the Lithium is contained on a surface, in the inside, or in both thereof of the silicon compound to which the inventive production method has been applied. The silicon compound containing Lithium like this can be obtained by selectively modifying (hereinafter, referred to as selective modification) a part of a $SiO_2$ component generated inside of the silicon compound to a Lithium compound.

More specifically, by making the silicon compound contact with the solution A containing the lithium (here, the solution A has the ether-based solvent as the solvent) for 3 minutes or more, the lithium can be inserted into the silicon compound. Further, as the solution A containing the lithium, a solution $A_1$ containing the lithium and a polycyclic aromatic compound or its derivative or a straight chain polyphenylene compound or its derivative, or a solution $A_2$ containing the lithium and amines (however, the solution $A_1$ and solution $A_2$ contain the ether-based solvent as the solvent) is preferably used.

Thus, when a method where the solution A (here, the solvent is the ether-based solvent) is brought into contact with the silicon compound to insert the lithium is used, compared with, for example, the case where the thermal doping method in which the silicon compound and metallic lithium are mixed and heated or the like is used, disproportionation inside the silicon compound is suppressed, and the cycle characteristics are further improved. Further, since the lithium is complexed with the polycyclic aromatic compound, the straight chain polyphenylene compound or the amines and is dissolved in the solution, the Lithium can be inserted more uniformly into the silicon compound. Among these, the solution $A_1$ that contains the lithium and the polycyclic aromatic compound or the straight chain polyphenylene compound is particularly preferably used. This is because the lithium insertion reaction by the solution $A_1$ can be handled in the neighborhood of the room temperature, and, further, the lithium is complexed with the polycyclic aromatic compound or the straight chain polyphenylene compound and is dissolved in the solution, the Lithium can be more uniformly inserted into the silicon compound. Further, by using the ether-based solvent as the solvent, since the complex of the lithium with the polycyclic aromatic compound or the straight chain polyphenylene compound or the amines is more stabilized, the lithium can be more efficiently inserted into the silicon compound.

According to the selective modification by the method like this, since the temperature is not raised excessively in the process of inserting the Lithium into the silicon compound, crystalline lithium silicate can be suppressed from being generated. When the crystalline Lithium silicate is suppressed from being generated, since Lithium ion conductivity in the silicon compound is improved and further crystallization in the silicon compound becomes difficult to proceed, the cycle characteristics are further improved.

As the ether-based solvents used in the solutions A, $A_1$ and $A_2$, diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, or mixed solvents thereof can be used. Among these, in particular, tetrahydrofuran, dioxane and 1,2-dimethoxy ethane are preferably used. These solvents are preferable to be dewatered and preferable to be deoxygenized.

Further, as the polycyclic aromatic compound contained in the solution $A_1$, one or more kinds of naphthalene, anthracene, phenanthrene, naphthacene, pentacene, pyrene, picene, triphenylene, coronene, chrysene, and derivatives thereof can be used, and, as the straight chain polyphenylene compound contained in the solution $A_1$, one or more kinds of biphenyl, terphenyl, and derivatives thereof can be used.

A concentration of the polycyclic aromatic compound or the straight chain polyphenylene compound in the solution $A_1$ is preferably between from $10^{-2}$ mol/L to 5 mol/L, and more preferably between from $10^{-1}$ mol/L to 3 mol/L. When the concentration of the polycyclic aromatic compound or the straight chain polyphenylene compound is $10^{-2}$ mol/L or more, a reaction between the lithium metal and the polycyclic aromatic compound or the straight chain polyphenylene compound tends to proceed, and a reaction time can be shortened. When the concentration of the polycyclic aromatic compound or the straight chain polyphenylene compound is 5 mol/L or less, a reaction product between the polycyclic aromatic compound or the straight chain polyphenylene compound and the lithium metal is difficult to attach to the silicon compound, and the silicon compound powder can be readily separated. Further, when the negative electrode active material is formed into a nonaqueous electrolyte secondary battery, a reaction residue is not eluted into an electrolytic solution, and the battery characteristics can be suppressed from being degraded due to a side reaction. Further, the lithium metal is preferably contained in an amount of 0.5 equivalent weight or more to the polycyclic aromatic compound or the straight chain polyphenylene compound and a part thereof may not be dissolved.

Further, as the amines contained in the solution $A_2$, dimethyl amine, ethyl amine, diethyl amine, ethylene diamine, and triethylene triamine can be used.

Further, a time during which the silicon compound and the solution A, A1, or A2 are contacted is preferably set to 3 minutes or more and 100 hours or less. When the contact time is 3 minutes or more, a sufficient doping amount of the lithium can be obtained. Further, at the time point when the contact time becomes 100 hours, the lithium insertion into the silicon compound reaches a substantial equilibrium state. Further, the reaction temperature is preferably from $-20°$ to $200°$ C., and more preferably from $0°$ C. to $50°$ C. Among these, the reaction temperature is particularly preferably set to the neighborhood of $20°$ C. In the temperature range as was described above, since a reaction speed is difficult to be decreased, and the lithium compound is difficult to generate precipitates due to a side reaction, a reaction rate of the lithium insertion reaction into the silicon compound is improved.

Subsequently, the silicon compound into which the lithium has been inserted is contacted with the solution B containing the polycyclic aromatic compound or its derivative or both thereof (here, the solution B contains one or more kinds selected from the ether-based solvent, the ketone-based solvent, the ester-based solvent, the alcohol-based solvent, and the amine-based solvent as the solvent) (step 3 of FIG. 1).

The polycyclic aromatic compound in the solution B reacts with the lithium contained in the silicon compound to form a complex. Since the complex is stable, the lithium desorption from the silicon compound proceeds. Further, in the solvent as was described above, since the complex between the polycyclic aromatic compound and the lithium is possible to exist stable instantaneously or sustainably, without causing a rapid reaction (a reaction accompanying ignition or boiling of the solvent), the lithium is softly desorbed from the silicon compound.

Thus, in the step 3, by desorbing a part of active Lithium from the silicon-based material, the rapid reaction is prevented from occurring in the following step 4. By the way, by passing only the step 3, the desorption of the active Lithium is insufficient, and, when an electrode is prepared in this state, during preparation of an aqueous slurry, a reaction occurs with moisture in the slurry or a binder, sometimes, a large heat generation is caused, that is, an aqueous slurry capable of being coated is not obtained, or if obtained, since the Lithium portion in the active material is eluted by the heat generation, the battery characteristics cannot be improved. Since what has undergone the step 3 after forming the silicon compound into the electrode is also insufficient in the deactivation of the Lithium portion, when left in dry air (dew point: $-20°$ C. or lower), the Lithium portion is gradually deactivated, lithium oxide, lithium hydroxide or lithium carbonate is generated on a surface to cause degradation of the battery characteristics. Therefore, it is necessary to further deactivate the active lithium by carrying out a step 4 that is a next step like in the present invention.

As the polycyclic aromatic compound contained in the solution B, one or more kinds of naphthalene, anthracene, phenanthrene, naphthacene, pentacene, pyrene, picene, triphenylene, coronene, chrysene, and derivatives thereof can be used.

Further, as the ether-based solvent, diethyl ether, tert-butyl methyl ether, tetrahydrofuran, dioxane, 1,2-dimethoxy ethane, diethylene glycol dimethyl ether, triethylene glycol dimethyl ether, and tetraethylene glycol dimethyl ether can be used.

As the ketone-based solvent, acetone, and acetophenone can be used.

As the ester-based solvent, methyl formate, methyl acetate, ethyl acetate, propyl acetate, and isopropyl acetate can be used.

As the alcohol-based solvent, methanol, ethanol, propanol, and isopropyl alcohol can be used.

As the amine-based solvent, methyl amine, ethyl amine, and ethylene diamine can be used.

Further, among the ether-based solvent, the ketone-based solvent, the ester-based solvent, the alcohol-based solvent, and the amine-based solvent, mixed solvents obtained by mixing two or more kinds thereof can be used.

A concentration of the polycyclic aromatic compound in the solution B is preferably between from $10^{-2}$ mol/L to 5 mol/L, and particularly preferably between from $10^{-1}$ mol/L to 3 mol/L. When the concentration of the polycyclic aromatic compound is $10^{-2}$ mol/L or more, a reaction between the lithium metal and the polycyclic aromatic compound tends to proceed, and a time for desorption reaction can be shortened. When the concentration of the polycyclic aromatic compound is 5 mol/L or less, a reaction product between the polycyclic aromatic compound and the lithium metal is difficult to attach to the silicon compound, and the silicon compound powder can be readily separated. Further, when the negative electrode active material is formed into a nonaqueous electrolyte secondary battery, a reaction residue is not eluted into the electrolytic solution, and the battery characteristics can be suppressed from being degraded due to a side reaction.

Further, a time during which the solution B and the silicon compound are contacted is preferably set to 3 minutes or more and 100 hours or less. When the contact time is 3 minutes or more, a sufficient drawing amount of the lithium can be obtained. Further, at the time point when the contact time becomes 100 hours, the lithium desorption into the solution B from the silicon compound reaches a substantial equilibrium state. Further, the reaction temperature is preferable to be from −20° C. to 200° C., and more preferable to be from 0° C. to 50° C. In particular, the reaction temperature is preferably set to in the neighborhood of 20° C. In the temperature range as was described above, since a decrease in the reaction speed is difficult to occur, and the lithium compound is difficult to generate precipitate due to a side reaction, a desorption rate of the lithium from the silicon compound is improved.

Further, in the step 3, the silicon compound and the solution B may be contacted a plurality of times while replacing the solution B with a new solution.

Subsequently, the silicon compound that has been contacted with the solution B is brought into contact with the solution C (here, the solution C contains one or more kinds selected from the ether-based material, the ketone-based material, and the ester-based material as the solvent, and a compound having a quinoid structure in a molecule as a solute) (step 4 of FIG. 1).

Since the compound having the quinoid structure in the molecule which is a solute of the solution C draws the Lithium from the silicon compound containing active Lithium in the solvent such as described above to be a salt of the Lithium and quinones to be dissolved in the solvent, the Lithium can be drawn until an equilibrium state is attained.

Further, in the solvent such as the ether-based material, the ketone-based material or the ester-based material, since activity of protons contained in a solvent molecule is low, in particular, in the ether-based solvent, its activity is particularly low, the side reaction in the desorption reaction of the Lithium from the silicon compound into which the Lithium has been inserted is difficult to occur.

Thus, in the step 4, the solution C and the silicon compound are brought into contact to completely deactivate the active Lithium. Thereby, it is made possible to apply the silicon-based active material containing Lithium to the aqueous slurry. Further, regarding also what has undergone from the step 2 to step 4 after forming the silicon compound into the electrode, since the Lithium is sufficiently deactivated, the electrode having resistance capable of enduring storage in air is formed.

As the ether-based material that is used as the solvent of the solution C, diethyl ether, tert-butyl methyl ether, tetrahydrofuran, dioxane, 1,2-dimethoxy ethane, diethylene glycol dimethyl ether, triethylene glycol dimethyl ether, and tetraethylene glycol dimethyl ether, or mixed solvents thereof can be used.

As the ketone-based material that is used as the solvent of the solution C, acetone, acetophenone, or a mixed solvent thereof can be used.

As the ester-based material that is used as the solvent of the solution C, methyl formate, methyl acetate, ethyl acetate, propyl acetate, isopropyl acetate, or a mixed solvent thereof can be used.

Further, among the ether-based material, the ketone-based material, and the ester-based material, a mixed solvent obtained by mixing two or more kinds thereof can be used.

Further, as the compound having a quinoid structure in the molecule, which is used as a solute of the solution C, benzoquinone, quinodimethane, quinodiimine, or a derivative thereof can be used. The quinoid structure is called a quinone structure or simply also a quinoid and is a structure in which endocyclic double bonds of a normal aromatic compound decreases by one, instead, two exocyclic double bonds are provided at a para site or an ortho site. The quinoid structure in the molecule used as the solute of the solution C may be any of a p-quinoid and an o-quinoid. By the way, "a compound having a quinoid structure in a molecule" is a compound comprising a structure expressed by, for example, the following formula (1) or formula (2) in a molecule.

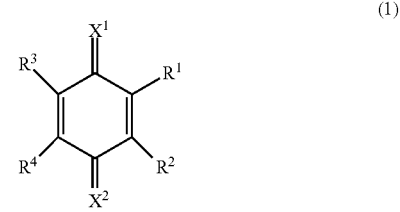

(1)

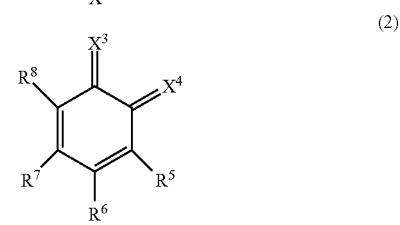

(2)

$R^1$, $R^2$, $R^3$ and $R^4$ in the formula (1) each may independently express a hydrogen atom or a substitution group, or $R^1$ and $R^2$, or $R^3$ and $R^4$ may couple with each other to form a ring that may have carbon atoms to which each of $R^1$, $R^2$, $R^3$ and $R^4$ couples and a substitution group, in particular, may form an aromatic ring. As the aromatic ring, a benzene ring and a naphthalene ring can be used. $X^1$ and $X^2$ may express, for example, an oxygen atom, an atomic group that contains nitrogen atoms and in which the nitrogen atoms form a double bond with carbons that constitute a carbon ring shown by the formula (1), or an atomic group that contains carbon atoms and in which the carbon atoms form a double bond with the carbons that constitute a carbon ring shown in the formula (1).

$R^5$, $R^6$, $R^7$ and $R^8$ in the formula (2) each may independently express, a hydrogen atom or a substitution group, or $R^5$ and $R^6$, $R^6$ and $R^7$, or $R^7$ and $R^8$ may couple with each other to form a ring that has carbon atoms to which each of $R^5$, $R^6$, $R^7$ and $R^8$ couples and a substitution group, in particular, may form an aromatic ring. As the aromatic ring, a benzene ring and a naphthalene ring can be used. $X^3$ and $X^4$ may express, in the same manner as in the formula (1), for example, an oxygen atom, an atomic group that contains nitrogen atoms and in which the nitrogen atoms form a double bond with carbons that constitute a carbon ring shown by the formula (2), or an atomic group that contains carbon atoms and in which the carbon atoms form a double bond with the carbons that constitute a carbon ring shown in the formula (2).

As what is preferable as the compound having the quinoid structure in the molecule and that may be used in the present invention, more specifically, p-benzoquinone, o-benzoquinone, naphthoquinone, anthraquinone, tetracyanoquinodimethane, N, N'-dicyanoquinodiimine and derivatives thereof can be mentioned.

Further, when a concentration of the solute in the solution C used during the reaction (the compound having a quinoid structure in the molecule) is $10^{-3}$ mol/L or more and $1\times10^0$ mol/L or less, excellent battery characteristics can be obtained.

As was described above, the negative electrode active material may be produced according to the inventive production method of the negative electrode active material. Thus produced negative electrode active material can constitute a negative electrode such as described below.

(2. Production Method of Negative Electrode for Nonaqueous Electrolyte Secondary Battery)
(Configuration of Negative Electrode)

Figure 2:
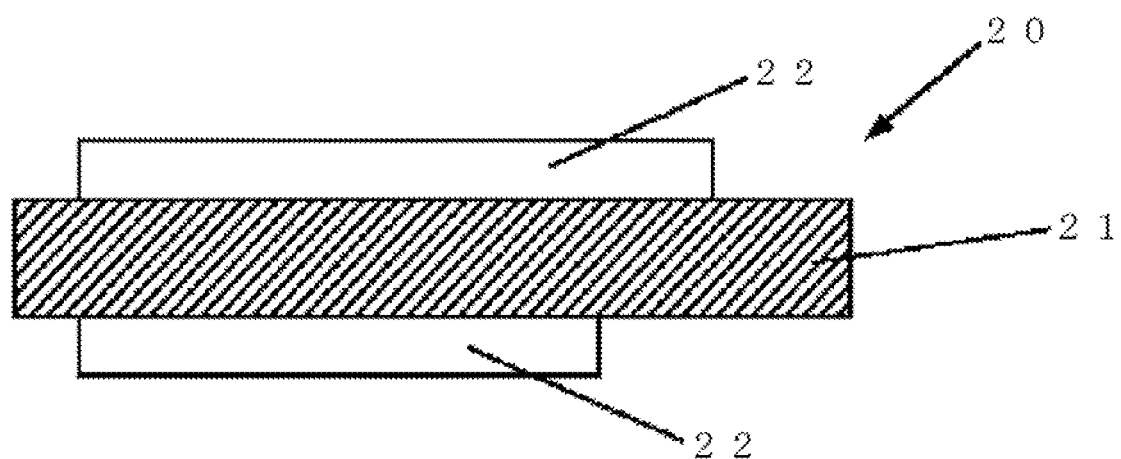
FIG. 2 is a schematic cross-sectional view showing one example of a configuration of a negative electrode using the negative electrode active material.

As shown in FIG. 2, a negative electrode 20 has a configuration comprising a negative electrode active material layer 22 on a negative electrode current collector 21. The negative electrode active material layer 22 may be provided on both sides or only on one side of the negative electrode current collector 21.

(Negative Electrode Current Collector)

A negative electrode current collector is an excellent electric conductive material and is configured from a material that has strong mechanical strength. As the electric conductive material that may be used in the negative electrode current collector 21, for example, copper (Cu) or nickel (Ni) can be mentioned. The electric conductive material is preferably a material that does not form an intermetallic compound with lithium (Li).

The negative electrode current collector 21 preferably contains carbon (C) or sulfur (S) other than the main element. This is because physical strength of the negative electrode current collector 21 is improved. In particular, this is because, in the case of comprising an active material layer that expands during charge, when the negative electrode current collector contains the above element, there is an effect of suppressing deformation of the electrode comprising the negative electrode current collector. A content of the above contained element is not particularly limited but, in particular, is preferably 100 ppm or less. This is because higher deformation suppression effect can be obtained.

A surface of the negative electrode current collector 21 may be roughened or may not be roughened. As examples of the negative electrode current collector having a roughened surface, metal foils subjected to, for example, an electrolytic treatment, an embossing treatment, or a chemical etching treatment can be mentioned. As examples of the negative electrode current collector of which surface is not roughened, for example, a rolled metal foil or the like can be mentioned.

(Negative Electrode Active Material Layer)

The silicon-based active material produced according to the inventive production method of the negative electrode active material becomes a material that constitutes the negative electrode active material layer 22. The negative electrode active material layer 22 contains the silicon-based active material and may further contain, from the viewpoint of the battery design, other materials such as a negative electrode binder or a negative electrode conductive assistant or the like. As the negative electrode active material, other than the silicon-based active material, a carbon-based active material may be contained.

The negative electrode like this may be produced by a coating method that uses the silicon-based active material produced according to the inventive production method of the negative electrode active material. The coating method is a method in which particles of the negative electrode active material and a binder, or as necessary, the conductive assistant and the carbon-based active material are mixed, followed by dispersing in an organic solvent or water, further followed by coating.

In this case, first, the negative electrode active material produced according to the inventive production method of the negative electrode active material, the conductive assistant, the binder, and the solvent such as water are mixed to obtain an aqueous slurry. At this time, as needs arise, the carbon-based active material may be also mixed. By the way, since the silicon-based active material produced according to the inventive method has a slight amount of active Lithium, the violent reaction with the aqueous slurry is not occurred and the negative electrode active material layer may be stably formed. Next, the aqueous slurry is coated on a surface of the negative electrode current collector, dried, thus, the negative electrode active material layer 22 of FIG. 2 is formed.

As the conductive assistant, any one or more kinds of, for example, carbon black, acetylene black, graphite such as scale-like graphite, Ketjen black, carbon nano tube, and carbon nano fiber may be used. These conductive assistants are preferably particle-like one having a median diameter smaller than that of the silicon compound. In this case, as the conductive assistant, for example, acetylene black can be selected.

Further, as the binder, for example, carboxymethylcellulose, a styrene-butadiene rubber and polyacrylic acid can be used.

Further, as the carbon-based active material, for example, pyrolytic carbons, cokes, glassy carbon fibers, organic polymer baked bodies, or carbon blacks can be used. Thus, the electric resistance of the negative electrode active material layer 22 can be lowered and expansion stress accompanying charging can be alleviated.

Further, like the inventive production method of the negative electrode, after preparation of the silicon compound, further after forming the electrode containing the prepared silicon compound (step 5 of FIG. 1), a negative electrode may be prepared by carrying out the inserting lithium, the making contact with the solution B, and the making contact with the solution C. More specifically, first, the electrode is formed, followed by inserting the lithium into the silicon compound contained in the electrode. The lithium can be inserted, for example, by making contact the solution A with the electrode to make contact the solution A with the silicon compound in the electrode. Next, the electrode containing the silicon compound into which the lithium has been inserted is contacted with the solution B, thus, the silicon compound in the electrode is contacted with the solution B. Subsequently, by contacting the electrode that has been contacted with the solution B with the solution C, the silicon compound is contacted with the solution C. By the way, when the silicon compound in the electrode is contacted with the solutions A, B or C, the silicon compound contained in the electrode can be contacted with the solutions A, B or C, for example, by dipping (soaking) the electrode in the solutions A, B or C, or by spraying the solutions A, B or C on the electrode.

(3. Production Method of Nonaqueous Electrolyte Secondary Battery)

Next, an inventive production method of the nonaqueous electrolyte secondary battery will be described, According to the inventive production method of the nonaqueous electrolyte secondary battery, a negative electrode active material is produced according to the above-mentioned inventive production method of the negative electrode active material, and the nonaqueous electrolyte secondary battery is produced by using the electrode containing the negative electrode active material. Hereinafter, the inventive production method of the nonaqueous electrolyte secondary battery will be more specifically described by taking a case of producing a laminate film type lithium ion secondary battery (hereinafter, may be called also as a laminate film type secondary battery) as an example.

(Configuration of Laminate Film Type Secondary Battery)

Figure 3:
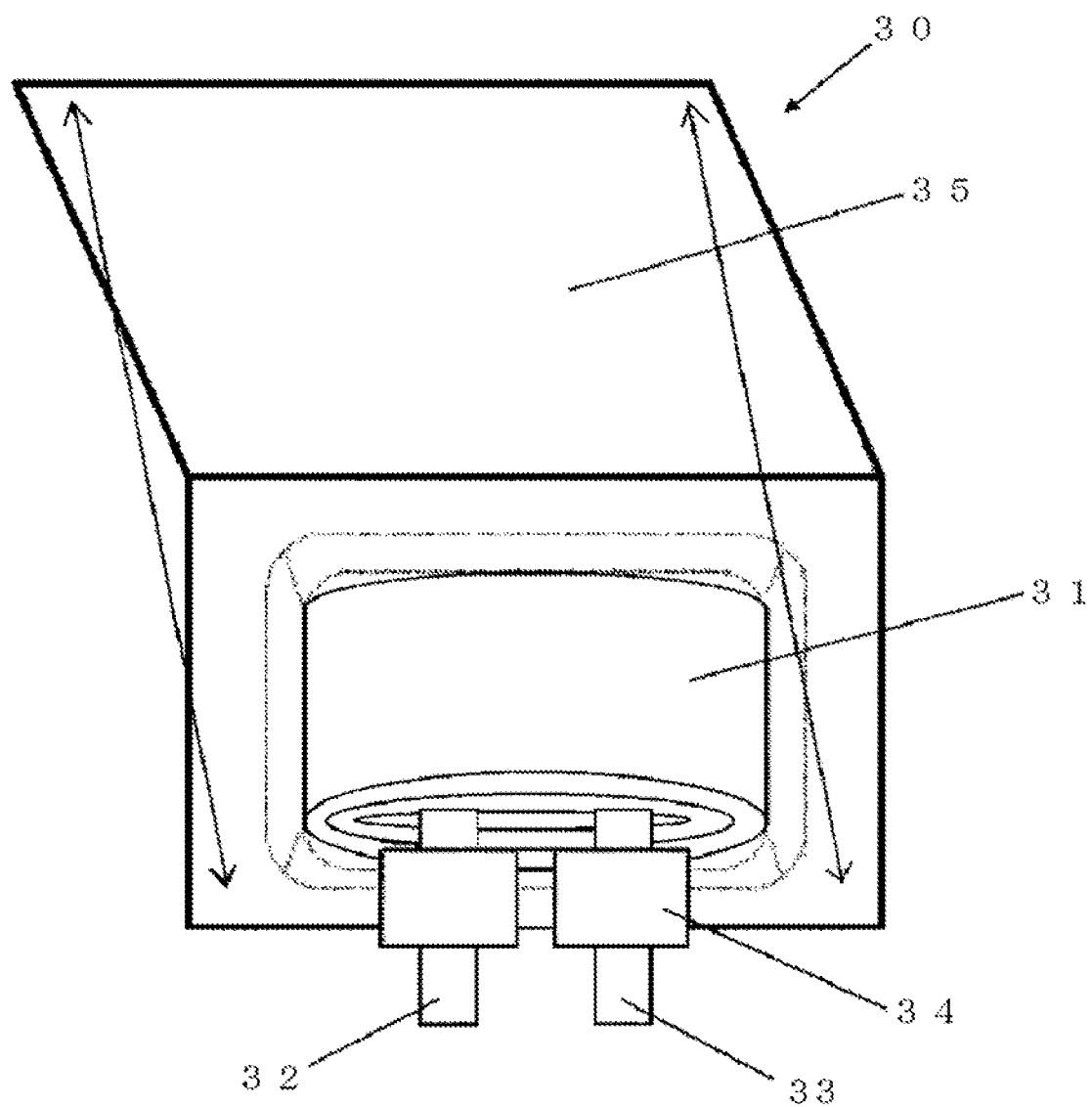
FIG. 3 is an exploded diagram showing one example of a configuration of a nonaqueous electrolyte secondary battery (laminate film type lithium ion secondary battery).

A laminate film type secondary battery 30 shown in FIG. 3 houses a wound electrode body 31 mainly inside of a sheet-like exterior member 35. The wound electrode body 31 has a separator between a positive electrode and a negative electrode and is wound. Further, there is a case where a laminate body having a separator between the positive electrode and the negative electrode is housed. In any of electrode bodies, a positive electrode lead 32 is attached to the positive electrode, and a negative electrode lead 33 is attached to the negative electrode. An outermost periphery part of the electrode body is protected by a protective tape.

The positive and negative electrode leads are led in one direction, for example, from an inside of the exterior member 35 toward an outside thereof. The positive electrode lead 32 is formed of a conductive material such as aluminum or the like, and the negative electrode lead 33 is formed of a conductive material such as nickel or copper.

The exterior member 35 is a laminate film in which, for example, a fusion layer, a metal layer, and a surface protective layer are stacked in this order, and, the laminate films are fused at outer peripheral parts in the fusion layers of two sheets of film, or, are stuck by an adhesive such that the fusion layer faces the wound electrode body 31. The fusion part is a film such as polyethylene or polypropylene, and the metal part is an aluminum foil. The protective layer is, for example, nylon or the like.

An adhesive film 34 is inserted between the exterior member 35 and the positive and negative electrode leads in order to prevent outer air from intruding. The material is, for example, polyethylene, polypropylene, or polyolefin resin.

(Positive Electrode)

The positive electrode has, in the same manner as in the negative electrode 20 of, for example, FIG. 2, a positive electrode active material layer on both sides or on one side of a positive electrode current collector.

The positive electrode current collector is formed of a conductive material such as aluminum.

The positive electrode active material layer contains any one or more kinds of positive electrode materials capable of absorbing/releasing lithium ions, and, may contain other materials such as a binder, a conductive assistant, and a dispersant depending on a design. In this case, details of the binder and the conductive assistant are the same as the negative electrode binder and the negative electrode conductive assistant described above.

As the positive electrode material, a Lithium-containing compound is desirable. As the Lithium-containing compound, a composite oxide comprising, for example, lithium and a transition metal element, or a phosphate compound comprising the Lithium and the transition metal element can be mentioned. Among these positive electrode materials, compounds containing at least one or more kinds of nickel, iron, manganese, and cobalt are preferred. Chemical formulas for these are represented by, for example, $Li_xM_1O_2$ or $Li_yM_2PO_4$. In the formulas, $M_1$ and $M_2$ represent at least one or more kinds of the transition metal elements. Values of x and y show different values depending on a battery charge/discharge state, but, are generally shown by $0.05 \leq x \leq 1.10$ and $0.05 \leq y \leq 1.10$.

As the composite oxide comprising the lithium and the transition metal element, for example, a lithium-cobalt composite oxide ($Li_xCoO_2$), a lithium-nickel composite oxide ($Li_xNiO_2$), and as the phosphate compound comprising the lithium and the transition metal element, for example, a lithium-iron phosphate compound ($LiFePO_4$) and a lithium-iron-manganese phosphate compound ($LiFe_{1-u}Mn_uPO_4$ ($0<u<1$)) can be mentioned. When these positive electrode materials are used, high battery capacity can be obtained and excellent cycle characteristics can be also obtained.

(Negative Electrode)

The negative electrode has the same configuration as the negative electrode 20 of FIG. 2, and has a negative electrode active material layer 22, for example, on both sides of the negative electrode current collector 21. The negative electrode preferably has a negative electrode charge capacity larger than an electric capacity (charge capacity as a battery) obtained from a positive electrode active material agent. This is because the lithium metal can be suppressed from being deposited on the negative electrode.

The positive electrode active material layer is provided on a part of both sides of the positive electrode current collector, and the negative electrode active material layer is also provided on a part of both sides of the negative electrode current collector. In this case, the negative electrode active material layer provided on, for example, the negative electrode current collector is provided on a region where an opposing positive electrode active material layer is not present. This is because stable battery design is carried out.

A non-facing region, that is, a region where the negative electrode active material layer and the positive electrode active material layer do not face is hardly influenced by the charge/discharge. Therefore, a state of the negative electrode active material layer is maintained just as immediately after the formation. Thereby, a composition of the negative electrode active material or the like can be accurately investigated with excellent reproducibility irrespective of the presence or non-presence of the charge/discharge.

(Separator)

The separator separates the positive electrode and the negative electrode and allows passage of lithium ions while preventing current short-circuit accompanying the contact of both electrodes from occurring. The separator is formed of a porous film made of, for example, a synthetic resin, or ceramic, and may have a stacked structure in which two or more kinds of porous films are stacked. As examples of the synthetic resin, polytetrafluoroethylene, polypropylene, and polyethylene can be mentioned.

(Electrolytic Solution)

At least a part of the active material layer or the separator is impregnated with a liquid electrolyte (electrolytic solution). The electrolytic solution has an electrolyte salt dissolved in the solvent and may contain other materials such as an additive or the like.

As the solvent, for example, a nonaqueous solvent can be used. As examples of the nonaqueous solvents, ethylene carbonate, propylene carbonate, butylene carbonate, dimethyl carbonate, diethyl carbonate, ethyl methyl carbonate, methyl propyl carbonate, 1,2-dimethoxy ethane, and tetrahydrofuran can be mentioned.

Among these, it is desirable to use at least one or more kinds of ethylene carbonate, propylene carbonate, dimethyl carbonate, diethyl carbonate, and ethyl methyl carbonate. This is because more excellent characteristics can be obtained. Further, in this case, more advantageous characteristics can be obtained by combining a high viscosity solvent such as ethylene carbonate or propylene carbonate and a low viscosity solvent such as dimethyl carbonate, ethyl methyl carbonate or diethyl carbonate. This is because dissociability or ionic mobility of the electrolyte salt is improved.

It is preferable to contain an unsaturated carbon bond cyclic carbonic ester as a solvent additive. This is because a stable film is formed on a surface of the negative electrode during charge/discharge to be able to suppress a decomposition reaction of the electrolytic solution. As examples of the unsaturated carbon bond cyclic carbonic ester, for example, vinylene carbonate and vinyl ethylene carbonate can be mentioned.

Further, it is preferable to contain a sultone (cyclic sulfonic acid ester) as the solvent additive. This is because the chemical stability of the battery is improved. As examples of the sultone, propane sultone and propene sultone can be mentioned.

Further, the solvent preferably contains an acid anhydride. This is because the chemical stability of the electrolytic solution is improved. As the acid anhydride, for example, propane disulfonic acid anhydride can be mentioned.

The electrolyte salt can contain any one or more kinds of light metal salts such as lithium salts. As the lithium salt, for example, the following materials can be mentioned. Lithium hexafluorophosphate ($LiPF_6$), lithium tetrafluoroborate ($LiBF_4$) or the like can be mentioned.

A content of the electrolyte salt is preferably 0.5 mol/kg or more and 2.5 mol/kg or less relative to the solvent. This is because high ionic conductivity can be obtained.

(Production Method of Laminate Film Type Secondary Battery)

At the beginning, a positive electrode is prepared by using the above positive electrode material. First, a positive electrode mixture is formed by mixing the positive electrode active material and, as necessary, a binder and a conductive assistant, followed by dispersing in an organic solvent to form a positive electrode mixture slurry. Subsequently, the mixture slurry is coated on the positive electrode current collector by a coating apparatus such as a knife roll or a die coater with a die head and dried with hot air to obtain a positive electrode active material layer. At the end, the positive electrode active material layer is compression molded by a roll press machine or the like. At this time, heating may be applied. Further, the compression, heating may be repeated a plurality of times.

Next, by using the same operation procedure as in the preparation of the above negative electrode 20, the negative electrode active material layer is formed on the negative electrode current collector to form a negative electrode (see FIG. 2).

A positive electrode and a negative electrode are prepared by the same preparation procedure as in the above. In this case, on each of both sides of the positive electrode and negative electrode current collectors, the active material layer may be formed. At this time, as shown in FIG. 2, in any of the electrodes, active material coating lengths on the both side parts may be displaced.

Subsequently, the electrolytic solution is prepared. Further subsequently, by using ultrasonic welding or the like, the positive electrode lead 32 of FIG. 3 is attached to the positive electrode current collector and the negative electrode lead 33 is attached to the negative electrode current collector. Then, the positive electrode and the negative electrode are stacked via the separator, or are wound to prepare a wound electrode body, followed by adhering a protective tape to the outermost peripheral part thereof. Next, the wound body is molded into a flat shape. Then, after inserting the wound electrode body between folded film-like exterior member 35, insulation parts of the exterior member are adhered by a thermal fusion method, and with only one direction opened, the wound electrode body is encapsulated. Then, an adhesive film 34 is inserted between the positive electrode lead 32, and the negative electrode lead 33 and the exterior member 35. A predetermined amount of the above prepared electrolytic solution is charged from a releasing part, followed by vacuum impregnation. After the impregnation, the releasing part is adhered by a vacuum thermal fusion method.

As was described above, the laminate film type secondary battery 30 can be produced.

EXAMPLES

Hereinafter, the present invention will be more specifically described with reference to examples and comparative examples of the present invention. However, the present invention is not limited to these examples.

Example 1-1

First, a silicon-based active material was prepared as shown below.

First, a raw material in which metallic silicon and silicon dioxide are mixed (vaporization starting material) was set in a reaction furnace, what was vaporized in an atmosphere with a vacuum degree of 10 Pa was deposited on an absorption plate, after sufficiently cooling, a deposit ($SiO_x$: x=1) was taken out and pulverized by a ball mill. Then, a particle size of the particles of the silicon compound was adjusted by classification. Thereafter, a carbon film was coated on a surface of particles of the silicon compound by performing thermal CVD.

Subsequently, a powder of the silicon compound covered with the carbon film was soaked in a solution (solution $A_1$) in which a piece of lithium and biphenyl were dissolved in tetrahydrofuran (hereinafter, referred to also as THF). The solution $A_1$ of Example 1-1 was prepared by dissolving biphenyl in the THF solvent at the concentration of 1 mol/L, followed by adding the piece of lithium of a mass portion of 10% by mass relative to a mixed liquid of the THF and biphenyl. Further, a temperature of the solution when soaking the powder of the silicon compound was set to 20° C., and the soaking time was set to 10 hours. After that, the powder of the silicon compound was filtered. According to the above treatment, the lithium was inserted in the silicon compound.

Next, in a solution (solution B) in which naphthalene was dissolved in THF, the powder of the silicon compound after lithium insertion was soaked. The solution B of Example 1-1 was prepared by dissolving naphthalene in the THF solvent at the concentration of 2 mol/L. Further, a temperature of the solution when the powder of the silicon compound is soaked was set to 20° C., and the soaking time was se to 20 hours. After that, the powder of the silicon compound was filtered.

Then, the powder of the silicon compound after contact with the solution B was soaked in a solution (solution C) in which p-benzoquinone was dissolved in THF at the concentration of 1 mol/L. The soaking time was set to 2 hours. After that, the powder was filtered.

Next, the silicon compound was cleansed, and the cleansed silicon compound was dried under reduced pressure. As was shown above, the silicon-based active material was produced.

Subsequently, a test cell comprising the electrode containing the silicon-based active material produced as described above and a lithium counter electrode was prepared, and initial charge/discharge characteristics in an initial charge/discharge were investigated. In this case, a 2032 type coin battery was assembled as a test cell.

An electrode containing particles of the silicon-based active material was prepared as shown below. First, the particles of silicon-based active material (powder of the silicon-based compound), a binder (polyacrylic acid (hereinafter, referred to also as PAA)), a conductive assistant 1 (scale-like graphite), and a conductive assistant 2 (acetylene black) were mixed at a dry mass ratio of 76.5:10.0:10.80:2.70, followed by diluting with water, thus a paste-like mixture slurry was formed. As a solvent of polyacrylic acid used as the binder, water was used. Then, the mixture slurry was coated on both sides of the current collector with a coating apparatus, followed by drying. As the current collector, an electrolytic copper foil (thickness=20 μm) was used. At the end, baking was performed under a vacuum atmosphere at 90° C. for 1 hour. Thus, the negative electrode active material layer was formed.

An electrolytic solution of the test cell was prepared as shown below. After mixing solvents (4-fluoro-1,3-dioxolan-2-one (FEC), ethylene carbonate (EC) and dimethyl carbonate (DMC)), an electrolyte salt (lithium hexafluorophosphate: $LiPF_6$) was dissolved therein, thus an electrolytic solution was prepared. In this case, a composition of the solvent was set to FEC:EC:DMC=10:20:70 by a volume ratio, and a content of the electrolyte salt was set to 1.0 mol/kg to the solvent.

As the counter electrode, a metal lithium foil having a thickness of 0.5 mm was used. Further, as the separator, polyethylene having a thickness of 20 μm was used.

Subsequently, a bottom lid, a lithium foil, and a separator of a 2032 type coin battery were superposed, 150 mL of the electrolytic solution was charged, followed by superposing the negative electrode and the spacer (thickness: 1.0 mm), followed by charging 150 mL of the electrolytic solution, further followed by assembling a spring and an upper lid of the coin battery in this order, followed by caulking with an automatic coin cell caulking apparatus, thus a 2032 type coin battery was prepared.

Subsequently, the prepared 2032 type coin battery was charged at a constant current density of 0.2 $mA/cm^2$ until 0.0 V is attained, at a stage where the voltage reached 0.0 V, charge was performed at a constant voltage of 0.0 V until the current density reaches 0.02 $mA/cm^2$, and during discharge, discharge was performed at a constant current density of 0.2 $mA/cm^2$ until the voltage reaches 1.2 V. Then, the initial charge/discharge characteristics in the initial charge/discharge were investigated.

Subsequently, in order to evaluate the cycle characteristics of the nonaqueous electrolyte secondary battery that uses the negative electrode active material of the present invention, a laminate film type secondary battery 30 such as shown in FIG. 3 was prepared in the following manner.

At the beginning, a positive electrode to be used for the laminate film type secondary battery was prepared. By mixing 95 parts by mass of $LiCoO_2$ that is a lithium-cobalt composite oxide as a positive electrode active material, 2.5 parts by mass of a positive electrode conductive assistant (acetylene black), and 2.5 parts by mass of a positive electrode binder (polyvinylidene fluoride, Pvdf), a positive electrode mixture was prepared. Subsequently, the positive electrode mixture was dispersed in an organic solvent (N-methyl-2-pyrrolidone: NMP) to form a paste-like slurry. Next, the slurry was coated on both sides of the positive electrode current collector by a coating apparatus having a die head, followed by drying with a hot air drier. At this time, the positive electrode current collector having a thickness of 15 μm was used. At the end, compression molding was applied with a roll press.

As a negative electrode, one prepared according to the same procedure as in the electrode containing the silicon-based active material of the test cell was used.

As an electrolytic solution, one prepared according to the same procedure as in the electrolytic solution of the test cell was used.

Next, a laminate film type lithium ion secondary battery was assembled as shown below. At the beginning, an aluminum lead was ultrasonic welded to one end of the positive electrode current collector and a nickel lead was welded to the negative electrode current collector. Subsequently, the positive electrode, the separator, the negative electrode and the separator were stacked in this order and wound in the longitudinal direction to obtain a wound electrode body. A winding end part thereof was fixed by a PET protective tape. As the separator, a laminate film of 12 μm in which a film comprising a porous polyethylene as a main component is sandwiched by a film comprising porous polypropylene as a main component was used. Subsequently, after sandwiching the electrode body between the exterior members, outer periphery parts excluding one side were sealed by a thermal fusion method to house the electrode body inside thereof. As the exterior member, an aluminum laminated film in which a nylon film, an aluminum foil, and a polypropylene film are stacked was used. Subsequently, the prepared electrolytic solution was charged from an opening part and impregnated under a vacuum atmosphere, followed by sealing by the thermal fusion method.

The cycle characteristics (retention rate %) of the laminate film type lithium ion secondary battery prepared as shown above were investigated.

The cycle characteristics were investigated as shown below. At the beginning, two cycles of charge/discharge were carried out under the atmosphere of 25° C. for stabilizing the battery and a discharging capacity at the second cycle was measured. Subsequently, the charge/discharge was performed until a total number of cycles becomes 100 cycles, and the discharging capacity was measured at each cycle. At the end, a capacity retention rate was calculated by dividing the discharging capacity at the $100^{th}$ cycles by the discharging capacity at the $2^{nd}$ cycle (because of % expression multiplied by 100). As the cycle condition, charge at a constant current density of 2.5 mA/cm² was performed until reaching 4.3 V, at the stage when a voltage 4.3 V was attained, charge was performed at a constant voltage of 4.3 V until the current density reaches 0.25 mA/cm². Further, during discharge, discharge was performed until the voltage reaches 3.0 V at the constant current density of 2.5 mA/cm².

Examples 1-2 to 1-15

Each of negative electrode active materials was prepared in the same procedure as in Example 1-1 except that species of the aromatic compound added to the solution B, the solvent, the concentration of the aromatic compound, the soaking time to the solution B, and the temperature of the solution B were changed as shown in Table 1. And, in the same manner as in Example 1-1, the battery characteristics were evaluated.

Comparative Examples 1-1 to 1-4

In Comparative Example 1-1, a negative electrode active material was prepared in the same process as in Example 1-1 except that in the solution B, in the place of the polycyclic aromatic compound, benzene (a THF solution, 1 mol/L) was used, and the soaking time was set to 10 hours. And, in the same manner as in Example 1-1, the battery characteristics were evaluated.

In Comparative Example 1-2, the step 3 was not applied, that is, the silicon compound after Lithium insertion was not brought into contact with the solution B, but was brought into contact with the solution C.

In Comparative Example 1-3, in the place of the solution B, a liquid that does not contain the polycyclic aromatic compound as the solute, but is made of only THF was used. Further, the soaking time in the liquid was set to 10 hours.

In Comparative Example 1-4, water was used as the solvent, and naphthalene was dispersed in the water. That is, since naphthalene is hardly dissolved in water, in the place of the solution B, an aqueous dispersion of naphthalene was used. Further, the soaking time in the aqueous dispersion was set to 1 minute.

When the initial charge/discharge characteristics of the test cells (coin battery) and the capacity retention rates of the laminate film type secondary batteries prepared in Examples 1-1 to 1-15 and Comparative Examples 1-1 to 1-4 were investigated, results shown in Table 1 were obtained.

TABLE 1

| | Solution B (or a liquid used in the place of solution B) | | | | | Battery characteristics | |
|---|---|---|---|---|---|---|---|
| | Aromatic compound species | Solvent | Concentration (mol/L) | Soaking time | Solution temperature (° C.) | Retention rate (%) | Initial efficiency (%) |
| Example 1-1 | Naphthalene | THF | 2 | 20 Hours | 20 | 83.3 | 78.2 |
| Example 1-2 | Anthracene | THF | 2 | 20 Hours | 20 | 83.2 | 78.2 |
| Example 1-3 | Phenanthrene | THF | 2 | 20 Hours | 20 | 83.1 | 78.2 |
| Example 1-4 | Naphthalene | Acetone | 2 | 20 Hours | 20 | 82.8 | 77.8 |
| Example 1-5 | Naphthalene | Ethyl acetate | 2 | 20 Hours | 20 | 82.7 | 77.9 |
| Example 1-6 | Naphthalene | Ethyl amine | 2 | 20 Hours | 20 | 82.9 | 77.9 |
| Example 1-7 | Naphthalene | Ethanol | 2 | 20 Hours | 20 | 82.3 | 76.4 |
| Example 1-8 | Naphthalene | THF | $1.0 \times 10^{-3}$ | 100 Hours | 20 | 78.6 | 73.5 |
| Example 1-9 | Naphthalene | THF | $1.0 \times 10^{-2}$ | 20 Hours | 20 | 82.4 | 73.5 |
| Example 1-10 | Naphthalene | THF | 3 | 20 Hours | 20 | 83.0 | 78.0 |
| Example 1-11 | Naphthalene | THF | 6 | 20 Hours | 20 | 79.6 | 74.6 |
| Example 1-12 | Naphthalene | THF | 2 | 20 Hours | 50 | 80.3 | 78.4 |
| Example 1-13 | Naphthalene | THF | 2 | 20 Hours | −20 | 80.0 | 78.6 |
| Comparative Example 1-1 | Benzene | THF | 1 | 10 Hours | 20 | — | — |
| Comparative Example 1-2 | — | — | — | — | — | — | — |
| Comparative Example 1-3 | — | THF | No solute | 10 Hours | 20 | — | — |
| Example 1-14 | Naphthalene | THF | 2 | 1 minute | 20 | 76.6 | 70.1 |
| Comparative Example 1-4 | Naphthalene | Water | 2 | 1 minute | 20 | — | — |
| Example 1-15 | Naphthalene | THF | 2 | 5 minutes | 20 | 78.9 | 73.5 |

As is obvious from Table 1, when the solution B containing the polycyclic aromatic compound such as naphthalene, anthracene, or phenanthrene was used, excellent initial efficiencies were obtained. In particular, as shown in Example 1-1 to Example 1-3, when naphthalene or anthracene was used as the polycyclic aromatic compound, the retention rate is more improved than when phenanthrene was used. This is because due to particularly high stability of a complex generated by a reaction between the lithium contained in the silicon compound and naphthalene or anthracene, the desorption of the lithium from the silicon compound is more promoted.

Further, as the solvent used in the solution B, at least one or more kinds selected from the ether-based solvent, ketone-based solvent, ester-based solvent, alcohol-based solvent, and amine-based solvent are used. In these solvents, the complex between the polycyclic aromatic compound and the lithium may be stably present instantaneously or sustainably, and the lithium is mildly desorbed from the silicon compound. In particular, from results of Examples 1-1 to Examples 1-7, it is found that the ether-based solvent is desirably used.

Further, the concentration of the polycyclic aromatic compound in the solution B is preferably between from $10^{-2}$ mol/L to 5 mol/L, and particularly preferably between from $10^{-1}$ mol/L to 3 mol/L. Compared with the case where the concentration of the polycyclic aromatic compound is less than $10^{-2}$ mol/L like in Example 1-8, in the case where the concentration of the polycyclic aromatic compound is $10^{-2}$ mol/L or more and 5 mol/L or less (for example, Example 1-1), the retention rates and the initial efficiencies are improved. This is because the lithium was more efficiently desorbed from the silicon compound. Further, compared with the case where the concentration of the polycyclic aromatic compound exceeds 5 mol/L like in Example 1-11, in the case where the concentration of the polycyclic aromatic compound is $10^{-2}$ mol/L or more and 5 mol/L or less, the retention rate and the initial efficiency are improved. This is because when the negative electrode active material is formed into the nonaqueous electrolyte secondary battery, the reaction residue is not eluted into the electrolytic solution, thereby the battery characteristics could be suppressed from being degraded due to the side reaction.

Further, the temperature of the solution B is preferable to be close to 20° C. This is because when the temperature of the solution B is in the neighborhood of 20° C., a decrease in the reaction speed is difficult to occur, and, the lithium compound is difficult to generate precipitates due to the side reaction, the desorption rate of the lithium from the silicon compound is improved. Therefore, compared with the case where the temperature of the solution B is more or less than 20° C. like in Example 1-12 and Example 1-13, an example (for example, Example 1-1) where the temperature of the solution is 20° C. had more excellent retention rate.

Further, the contact time (soaking time) of the silicon compound with the solution B is preferably 3 minutes or more. As obvious from Table 1, compared with Example 1-14 where the contact time is less than 3 minutes, examples (for example, Examples 1-1 and 1-15) where the contact time is 3 minutes or more had more excellent battery characteristics.

In Comparative Examples 1-1 to 1-3, since the powder of silicon compound was red-heated when the silicon compound and the solution C were contacted, the following evaluation of the battery characteristics could not be conducted. Thus, in Comparative Example 1-2 where the silicon compound was not contacted with the solution B and Comparative Examples 1-1 and 1-3 where the silicon compound was treated with a solution that does not contain the polycyclic aromatic compound, since the lithium was insufficiently desorbed, the violent reaction with the solution C occurred.

Further, in Comparative Example 1-4, since the powder of silicon compound was red-heated when the silicon compound and the solution B were contacted, the following evaluation of the battery characteristics could not be conducted. This is because not the ether-based solvent, ketone-based solvent, ester-based solvent, alcohol-based solvent, or amine-based solvent, but water was used as the solvent.

Examples 2-1 to 2-7

Each of negative electrode active materials was prepared in the same procedure as in Example 1-1 except that the solvent species, the solute species, and the concentration of the solute of the solution C were changed as shown in Table 2. Then, in the same manner as in Example 1-1, the battery characteristics were evaluated.

Comparative Example 2-1, Comparative Example 2-2

In Comparative Example 2-1, a negative electrode active material was prepared in the same procedure as in Example 1-1 except that the silicon compound was not contacted with solution C. In Comparative Example 2-2, a negative electrode active material was prepared in the same procedure as in Example 1-1 except that in the place of the solution C, a liquid in which THF is used as the solvent, and cyanobenzene that is a compound that does not have a quinoid structure in the molecule is used as the solute was used. Also in Comparative Examples 2-1 and 2-2, in the same manner as in Example 1-1, the battery characteristics were evaluated.

When the initial charge/discharge characteristics of the test cells and the capacity retention rates of the laminate film type secondary batteries of Examples 2-1 to 2-7 and Comparative Example 2-1 and Comparative Example 2-2 were investigated, results shown in Table 2 were obtained.

TABLE 2

| | Solution C (or a liquid used in the place of Solution C) | | | Battery characteristics | |
|---|---|---|---|---|---|
| | Solvent | Solute | Concentration (mol/L) | Retention rate (%) | Initial efficiency (%) |
| Example 1-1 | THF | p-benzoquinone | 1 | 83.3 | 78.1 |
| Example 2-1 | THF | p-benzoquinone | $1.0 \times 10^{-3}$ | 82.7 | 77.1 |
| Example 2-2 | THF | p-benzoquinone | $1.0 \times 10^{-2}$ | 82.9 | 77.8 |
| Example 2-3 | Ethyl acetate | p-benzoquinone | 1 | 83.5 | 78.1 |
| Example 2-4 | Acetone | p-benzoquinone | 1 | 83.5 | 78.1 |
| Example 2-5 | THF | Tetracyanoquinodimethane | 1 | 83.3 | 77.9 |
| Example 2-6 | THF | N,N'-dicyano quinodiimine | 1 | 82.3 | 76.3 |
| Example 2-7 | THF | o-benzoquinone | 1 | 83.6 | 78.0 |

TABLE 2-continued

| | Solution C (or a liquid used in the place of Solution C) | | | Battery characteristics | |
|---|---|---|---|---|---|
| | Solvent | Solute | Concentration (mol/L) | Retention rate (%) | Initial efficiency (%) |
| Comparative Example 2-1 | — | — | — | — | — |
| Comparative Example 2-2 | THF | Cyanobenzene | 1 | — | — |

As is obvious from Table 2, in the case where one that contains the compound having a quinoid structure in the molecule as the solute is used as the solution C (Examples 1-1, 2-1 to 2-6 have a p-quinoid structure, and Example 7 has an o-quinoid structure), excellent battery characteristics were obtained. Like in Comparative Examples 2-1 and 2-2, when the solution C that contains the compound having the quinoid structure in the molecule was not used, since the slurry was red-heated during the preparation of the electrode, the electrode could not be formed. As the solvent of the solution C, the ether-based solvent, the ester-based solvent, and the ketone-based solvent are preferable, in particular, the ether-based solvent is preferable. In these solvents, since activity of protons contained in the solvent molecule is low, in particular, in the ether-based solvent, its activity is particularly low, the side reaction is difficult to occur in the reaction of an oxidant and the active Lithium in the silicon compound. Further, when a concentration of the solute in the solution C used during the reaction is $10^{-3}$ mol/L or more and $1 \times 10^0$ mol/L or less, excellent battery characteristics may be obtained.

Examples 3-1 to 3-19

Each of negative electrode active materials was prepared in the same procedure as in Example 1-1 except that the aromatic compound species, the solvent species, and the concentration of the aromatic compound of the solution A containing Lithium, the soaking time to the solution A, and the temperature of the solution A were changed as shown in Table 3. Then, in the same procedure as in Example 1-1, the battery characteristics were evaluated.

Comparative Example 3-1

A negative electrode active material was prepared in the same procedure as in Example 1-1 except that the inserting the lithium into the silicon compound was not performed. Then, in the same procedure as in Example 1-1, the battery characteristics were evaluated.

When the initial charge/discharge characteristics of the test cells (coin battery) and the capacity retention rates of the laminate film type secondary batteries prepared in Examples 3-1 to 3-19 and Comparative Example 3-1 were investigated, results shown in Table 3 were obtained.

TABLE 3

| | Solution A (or a liquid used in the place of solution A) | | | | | Battery characteristics | |
|---|---|---|---|---|---|---|---|
| | Aromatic compound species | Solvent | Concentration (mol/L) | Soaking time | Temperature of solution (° C.) | Retention rate (%) | Initial efficiency (%) |
| Example 1-1 | Biphenyl | THF | 1 | 10 Hours | 20 | 83.3 | 78.2 |
| Example 3-1 | Naphthalene | THF | 1 | 20 Hours | 20 | 83.2 | 76.6 |
| Example 3-2 | Phenanthrene | THF | 1 | 20 Hours | 20 | 83.0 | 75.4 |
| Example 3-3 | Biphenyl | Diethyl ether | 1 | 10 Hours | 20 | 83.0 | 75.7 |
| Example 3-4 | Biphenyl | tert-butyl methyl ether | 1 | 10 Hours | 20 | 82.9 | 75.3 |
| Example 3-5 | Biphenyl | THF | $1.0 \times 10^{-3}$ | 20 Hours | 20 | 82.7 | 74.2 |
| Example 3-6 | Biphenyl | THF | $1.0 \times 10^{-2}$ | 10 Hours | 20 | 83.1 | 76.3 |
| Example 3-7 | Biphenyl | THF | 4.5 | 10 Hours | 20 | 83.0 | 76.7 |
| Example 3-8 | Biphenyl | THF | 6 | 20 Hours | 20 | 82.5 | 74.3 |
| Example 3-9 | Biphenyl | THF | 1 | 10 Hours | 50 | 83.1 | 77.2 |
| Example 3-10 | Biphenyl | THF | 1 | 10 Hours | −20 | 83.2 | 77.3 |
| Example 3-11 | Biphenyl | THF | 1 | 50 Hours | 20 | 83.3 | 78.4 |
| Example 3-12 | Biphenyl | THF | 1 | 100 Hours | 20 | 83.3 | 78.5 |
| Example 3-13 | Biphenyl | THF | 1 | 200 Hours | 20 | 83.2 | 78.6 |
| Example 3-14 | — | Ethylene diamine | No solute | 10 Hours | −20 | 82.0 | 77.5 |
| Example 3-15 | — | Diglyme | No solute | 20 Hours | 150 | 80.2 | 77.0 |
| Comparative Example 3-1 | — | — | — | — | — | 72.6 | 66.2 |

TABLE 3-continued

| | Solution A (or a liquid used in the place of solution A) | | | | | Battery characteristics | |
|---|---|---|---|---|---|---|---|
| | Aromatic compound species | Solvent | Concentration (mol/L) | Soaking time | Temperature of solution (° C.) | Retention rate (%) | Initial efficiency (%) |
| Example 3-16 | Benzene | THF | 1 | 10 Hours | 20 | 76.6 | 70.4 |
| Example 3-17 | Biphenyl | Nitrobenzene | 1 | 10 Hours | 20 | 76.6 | 70.0 |
| Example 3-18 | Biphenyl | THF | 1 | 1 minute | 20 | 76.7 | 70.4 |
| Example 3-19 | Biphenyl | THF | 1 | 5 minutes | 20 | 80.1 | 72.1 |

As a method of inserting the lithium into the silicon compound, there are methods of bringing the silicon compound into contact with the solution A containing the lithium. Among these, it is preferable to use the solution $A_1$ that contains the lithium and the polycyclic aromatic compound or its derivative or the straight chain polyphenylene compound or its derivative or to use the solution $A_2$ that contains the lithium and amines as the solution A containing the lithium, and among these, it is particularly preferable to use the solution $A_1$. This is because the solution $A_1$ can be handled in the neighborhood of the room temperature. Further, when naphthalene or phenanthrene was used as the polycyclic aromatic compound contained in the solution $A_1$ and biphenyl was used as the straight chain polyphenylene compound contained in the solution $A_1$, compared with the case where benzene that is not the polycyclic aromatic compound or the straight chain polyphenylene compound was added (Example 3-16), a significant improvement in the initial efficiency was found. Further, in particular, when compared with Examples 1-1, 3-1 and 3-2, in the case of Example 1-1 where the biphenyl was used as the straight chain polyphenylene compound, the battery characteristics were more improved. This is because since the complex generated by the reaction of the lithium and biphenyl has high activity and stability, the lithium insertion into the silicon compound can be maintained at a more rapid speed.

Further, in the case where the ether-based solvent was used, the battery characteristics was more improved compares with Example 3-17 where the ether-based solvent was not used. This is because the complex between the lithium and the polycyclic aromatic compound or the straight chain polyphenylene compound can be present stable in the ether-based solvent, the insertion of the lithium into the silicon compound is likely to be sustained. Still further, in the case where THF was used as the ether-based solvent (Example 1-1), battery characteristics was more improved compared with the case where diethyl ether or tert-butyl methyl ether was used as the ether-based solvent (Examples 3-3 and 3-4). This is because in THF having relatively high dielectric constant among the ether-based solvents, the complex between the lithium and the polycyclic aromatic compound or the straight chain polyphenylene compound is particularly stably present, the lithium insertion into the silicon compound is likely to be sustained.

Further, the concentration of the polycyclic aromatic compound or the straight chain polyphenylene compound in the solution A is preferably between from $10^{-2}$ mol/L to 5 mol/L, and particularly preferably between from $10^{-1}$ mol/L to 3 mol/L. Compared with the case where the concentration of the polycyclic aromatic compound or the straight chain polyphenylene compound is less than $10^{-2}$ mol/L like in Example 3-5, in the case where the concentration of the polycyclic aromatic compound or the straight chain polyphenylene compound is $10^{-2}$ mol/L or more and 5 mol/L or less (for example, Examples 3-6, 3-7, and 1-1), the retention rates and the initial efficiencies are improved. This is because the lithium insertion into the silicon compound was more efficiently conducted. Further, compared with the case where the concentration of the polycyclic aromatic compound or the straight chain polyphenylene compound exceeds 5 mol/L like in Example 3-8, when the concentration of the polycyclic aromatic compound or the straight chain polyphenylene compound is $10^{-2}$ mol/L or more and 5 mol/L or less, the retention rate and the initial efficiency are improved. This is because when the negative electrode active material was formed into the nonaqueous electrolyte secondary battery, the reaction residue was not eluted into the electrolytic solution and the battery characteristics could be suppressed from being degraded due to the side reaction. By the way, in Example 3-8, the biphenyl remained partially undissolved.

Further, the temperature of the solution A is preferably close to 20° C. This is because when the temperature of the solution A is in the neighborhood of 20° C., a decrease in the reaction speed is difficult to occur, and, the lithium compound is difficult to generate precipitates due to the side reaction, the reaction rate of the insertion reaction of the lithium from the silicon compound is improved. Therefore, compared with the case where the temperature of the solution A is more or less than 20° C. like in Examples 3-9 and 3-10, examples where the temperature of the solution is 20° C. (for example, Example 1-1) had more excellent battery characteristics.

Further, the contact time of the powder of silicon compound and the solution A is desirable to be 3 minutes or more and 100 hours or less. When the contact time is 3 minutes or more (for example, Example 3-19), compared with the case of being shorter that 3 minutes (Example 3-18), the lithium may be sufficiently inserted into the silicon compound. Still further, around the time when the contact time reaches 100 hours, the lithium insertion into the silicon compound reaches a substantial equilibrium state.

By the way, the present invention is not limited to the above embodiments. The above embodiments are merely exemplary, and, all of what has the substantially same configuration as technical idea described in claims of the present invention and has the similar effects are comprised in the technical range of the present invention.

The invention claimed is:

1. A production method of a negative electrode active material for nonaqueous electrolyte secondary batteries, the method comprising:
   preparing a silicon compound $SiO_x$, wherein $0.5 \leq x \leq 1.6$;
   inserting lithium into the silicon compound;
   making the silicon compound into which the lithium has been inserted contact with a solution B containing:
      a polycyclic aromatic compound, a derivative thereof, or both; and
      one or more solvents selected from an ether-based solvent, a ketone-based solvent, an ester-based solvent, an alcohol-based solvent, and an amine-based solvent; and
   making the silicon compound that has been contacted with the solution B contact with a solution C containing:
      one or more solvents selected from an ether-based material, a ketone-based material, and an ester-based material; and
      a compound having a quinoid structure in a molecule as a solute.

2. The production method of a negative electrode active material for nonaqueous electrolyte secondary batteries according to claim 1, wherein in the making the silicon compound contact with the solution B, the silicon compound is contacted with the solution B for 3 minutes or more.

3. The production method of a negative electrode active material for nonaqueous electrolyte secondary batteries according to claim 1, wherein in the inserting lithium, the silicon compound is contacted with a solution A containing the lithium and the ether-based solvent for 3 minutes or more to insert the lithium into the silicon compound.

4. The production method of a negative electrode active material for nonaqueous electrolyte secondary batteries according to claim 2, wherein in the inserting lithium, the silicon compound is contacted with a solution A containing the lithium and the ether-based solvent for 3 minutes or more to insert the lithium into the silicon compound.

5. The production method of a negative electrode active material for nonaqueous electrolyte secondary batteries according to claim 3, wherein the solution A containing the lithium is:
   a solution $A_1$ containing the lithium, the ether-based solvent, and a polycyclic aromatic compound or its derivative or a straight chain polyphenylene compound or its derivative, or
   a solution $A_2$ containing the lithium, the ether-based solvent, and amines.

6. The production method of a negative electrode active material for nonaqueous electrolyte secondary batteries according to claim 4, wherein the solution A containing the lithium is:
   a solution $A_1$ containing the lithium, the ether-based solvent, and a polycyclic aromatic compound or its derivative or a straight chain polyphenylene compound or its derivative, or
   a solution $A_2$ containing the lithium, the ether-based solvent, and amines.

7. The production method of a negative electrode active material for nonaqueous electrolyte secondary batteries according to claim 5, wherein, as the solution A containing the lithium, the solution $A_1$ is used.

8. The production method of a negative electrode active material for nonaqueous electrolyte secondary batteries according to claim 6, wherein as the solution A containing the lithium, the solution $A_1$ is used.

9. The production method of a negative electrode active material for nonaqueous electrolyte secondary batteries according to claim 5, wherein as the solution $A_1$ containing the lithium, a solution containing the lithium, the ether-based solvent, and the straight chain polyphenylene compound or its derivative is used.

10. The production method of a negative electrode active material for nonaqueous electrolyte secondary batteries according to claim 6, wherein as the solution $A_1$ containing the lithium, a solution containing the lithium, the ether-based solvent, and the straight chain polyphenylene compound or its derivative is used.

11. The production method of a negative electrode active material for nonaqueous electrolyte secondary batteries according to claim 7, wherein as the solution $A_1$ containing the lithium, a solution containing the lithium, the ether-based solvent, and the straight chain polyphenylene compound or its derivative is used.

12. The production method of a negative electrode active material for nonaqueous electrolyte secondary batteries according to claim 8, wherein as the solution $A_1$ containing the lithium, a solution containing the lithium, the ether-based solvent, and the straight chain polyphenylene compound or its derivative is used.

13. The production method of a negative electrode active material for nonaqueous electrolyte secondary batteries according to claim 7, wherein one or more kinds of naphthalene, anthracene, phenanthrene, naphthacene, pentacene, pyrene, picene, triphenylene, coronene, chrysene, and derivatives thereof as the polycyclic aromatic compound, or one or more kinds of biphenyl, terphenyl, and derivatives thereof are used as the straight chain polyphenylene compound.

14. The production method of a negative electrode active material for nonaqueous electrolyte secondary batteries according to claim 8, wherein one or more kinds of naphthalene, anthracene, phenanthrene, naphthacene, pentacene, pyrene, picene, triphenylene, coronene, chrysene, and derivatives thereof are used as the polycyclic aromatic compound, or one or more kinds of biphenyl, terphenyl, and derivatives thereof are used as the straight chain polyphenylene compound.

15. The production method of a negative electrode active material for nonaqueous electrolyte secondary batteries according to claim 1, wherein the compound having a quinoid structure in a molecule is selected from benzoquinone, quinodimethane, quinodiimine, and derivatives thereof.

16. The production method of a negative electrode active material for nonaqueous electrolyte secondary batteries according to claim 2, wherein the compound having a quinoid structure in a molecule is selected from benzoquinone, quinodimethane, quinodiimine, and derivatives thereof.

17. The production method of a negative electrode active material for nonaqueous electrolyte secondary batteries according to claim 1, further comprising:
   before the inserting lithium, forming an electrode containing the silicon compound, wherein to the silicon compound contained in the electrode, the inserting the lithium, the making contact with the solution B, and the making contact with the solution C are applied.

18. A production method of a nonaqueous electrolyte secondary battery comprising:
   producing a negative electrode active material for nonaqueous electrolyte secondary batteries according to the production method of a negative electrode active material for secondary batteries according to claim 1; and producing a nonaqueous electrolyte secondary battery using an electrode containing the negative electrode active material for nonaqueous electrolyte secondary batteries.

19. A production method of a negative electrode for nonaqueous electrolyte secondary batteries, the method comprising:

forming an electrode containing a silicon compound $SiO_x$, wherein $0.5 \leq x \leq 1.6$;

inserting the lithium into the silicon compound contained in the electrode;

making the electrode containing the silicon compound into which the lithium has been inserted contact with a solution B to make the solution B contact with the silicon compound, the solution B containing:

a polycyclic aromatic compound, its derivative, or both; and one or more solvents selected from an ether-based solvent, a ketone-based solvent, an ester-based solvent, an alcohol-based solvent, and an amine-based solvent; and making the electrode that has been contacted with the solution B contact with a solution C to make the solution C contact with the silicon compound, the solution C containing:

one or more solvents selected of an ether-based material, a ketone-based material, and an ester-based material; and a compound having a quinoid structure in a molecule as a solute.

20. A production method of a nonaqueous electrolyte secondary battery, the method comprising:

producing a negative electrode for nonaqueous electrolyte secondary batteries according to the production method of a negative electrode for the nonaqueous electrolyte secondary batteries according to claim 19; and producing a nonaqueous electrolyte secondary battery using the negative electrode.

* * * * *